(12) United States Patent
Nakamura et al.

(10) Patent No.: US 12,744,878 B2
(45) Date of Patent: Sep. 22, 2026

(54) TRANSMITTANCE CONTROL APPARATUS

(71) Applicant: NTT DOCOMO, INC., Tokyo (JP)

(72) Inventors: Yuki Nakamura, Chiyoda-ku (JP); Yasuo Morinaga, Chiyoda-ku (JP); Mitsuhiro Goto, Chiyoda-ku (JP); Tatsuya Nishizaki, Chiyoda-ku (JP); Reo Mizuta, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/853,861

(22) PCT Filed: Feb. 28, 2023

(86) PCT No.: PCT/JP2023/007345

§ 371 (c)(1),
(2) Date: Oct. 3, 2024

(87) PCT Pub. No.: WO2023/203883

PCT Pub. Date: Oct. 26, 2023

(65) Prior Publication Data

US 2025/0233976 A1 Jul. 17, 2025

(30) Foreign Application Priority Data

Apr. 20, 2022 (JP) ................................ 2022-069478

(51) Int. Cl.
*H04N 13/133* (2018.01)
*H04N 13/194* (2018.01)
(Continued)

(52) U.S. Cl.
CPC ......... *H04N 13/398* (2018.05); *H04N 13/133* (2018.05); *H04N 13/194* (2018.05); *H04N 13/344* (2018.05); *H04N 13/361* (2018.05)

(58) Field of Classification Search
None
See application file for complete search history.

(56) References Cited

U.S. PATENT DOCUMENTS

2005/0046953 A1* 3/2005 Repetto ................ G02B 27/017 359/630
2017/0345391 A1* 11/2017 Usui ........................ G09G 5/10
2021/0020141 A1* 1/2021 Yuasa ..................... G06F 3/012

FOREIGN PATENT DOCUMENTS

JP 2005-96750 A 4/2005
JP 2018-141826 A 9/2018
WO WO 2017/094557 A1 6/2017

OTHER PUBLICATIONS

International Search Report issued May 9, 2023 in PCT/JP2023/007345 filed Feb. 28, 2023, 4 pages (with English translation).

* cited by examiner

*Primary Examiner* — Samuel D Fereja
(74) *Attorney, Agent, or Firm* — Oblon, McClelland, Maier & Neustadt, L.L.P.

(57) ABSTRACT

A transmittance control apparatus includes a first identifier configured to identify, based on display information indicating a target for display, a degree of lightness of the target for display; a second identifier configured to identify lightness of an environment in which a see-through display is disposed; a transmittance controller configured to: when the degree of lightness of the target for display does not fluctuate and the lightness of the environment fluctuates in a range less than or equal to a first lightness, reduce transmittance of the target for display displayed on the see-through display with an increase in the lightness of the environment; and control the transmittance of the target for display displayed on the see-through display at a first timing based on: a maximum lightness of the environment in a first period before to the first timing and the degree of lightness of the target for display.

10 Claims, 7 Drawing Sheets

(51) Int. Cl.

| | |
|---|---|
| ***H04N 13/344*** | (2018.01) |
| ***H04N 13/361*** | (2018.01) |
| ***H04N 13/398*** | (2018.01) |

| DEGREE OF LIGHTNESS Li OF CONTENT A1 | LIGHTNESS EB OF ENVIRONMENT [KLUX] | DEGREE OF LUMINANCE Lu OF CONTENT A1 [%] | TRANSMITTANCE CT OF CONTENT A1 [%] |
|---|---|---|---|
| E2 OR MORE (HIGHT) | 1.0 OR MORE | 50 | 50 |
| | 0.7 OR MORE AND LESS THAN 1.0 | 50 | 50 |
| | 0.5 OR MORE AND LESS THAN 0.7 | 60 | 40 |
| | 0.2 OR MORE AND LESS THAN 0.5 | 20 | 80 |
| | 0.1 OR MORE AND LESS THAN 0.2 | 10 | 90 |
| | LESS THAN 0.1 | 10 | 90 |
| E1 OR MORE AND LESS THAN E2 (MIDDLE) | 1.0 OR MORE | 50 | 50 |
| | 0.7 OR MORE AND LESS THAN 1.0 | 60 | 40 |
| | 0.5 OR MORE AND LESS THAN 0.7 | 60 | 40 |
| | 0.2 OR MORE AND LESS THAN 0.5 | 30 | 70 |
| | 0.1 OR MORE AND LESS THAN 0.2 | 20 | 80 |
| | LESS THAN 0.1 | 20 | 80 |
| LESS THAN E1 (LOW) | 1.0 OR MORE | 50 | 50 |
| | 0.7 OR MORE AND LESS THAN 1.0 | 50 | 50 |
| | 0.5 OR MORE AND LESS THAN 0.7 | 70 | 30 |
| | 0.2 OR MORE AND LESS THAN 0.5 | 50 | 50 |
| | 0.1 OR MORE AND LESS THAN 0.2 | 30 | 70 |
| | LESS THAN 0.1 | 30 | 70 |

EB
DT1
EBmax
EBK
0
T1
t

START
ACQUIRE CONTENT INFORMATION B1
S101
IDENTIFY DEGREE OF LIGHTNESS Li OF CONTENT
S102
IDENTIFY LIGHTNESS EB OF ENVIRONMENT
S103
IDENTIFY TARGET DEGREE OF LUMINANCE Lua
S104
GENERATE CONTENT INFORMATION B2 BASED ON TARGET DEGREE OF LUMINANCE Lua
S105
USE CONTENT INFORMATION B2 TO CONTROL TRANSMITTANCE CT OF CONTENT A1
S106
END

TRANSMITTANCE CONTROL APPARATUS

TECHNICAL FIELD

The present invention relates to transmittance control apparatuses.

BACKGROUND ART

A see-through display for displaying a target for display, such as content, is known. A user of a see-through display visually recognizes the target for display that is displayed on the see-through display together with external light rays that pass through the see-through display. Patent Document 1 discloses a see-through display for controlling transmittance of external light rays based on a degree of lightness of the external light rays and a degree of luminance of a display image. This see-through display determines the transmittance of the external light rays by use of a moving average of values of change in amount of the external light rays so as to prevent excessive change in the transmittance of the external light rays, the excessive change being caused by a change in the degree of lightness of the external light rays.

RELATED ART DOCUMENT

Patent Document

Patent Document 1: Japanese Patent Application Laid-Open Publication No. 2018-141826.

SUMMARY OF THE INVENTION

Problem to be Solved by the Invention

In the see-through display described in Patent Document 1, when the degree of luminance of the display image does not vary, the transmittance of the external light rays always follows a change in the external light rays. Thus, for example, when a user who wears the see-through display alternately passes through a sunny place and a shady place, the transmittance of the external light rays is sequentially changed in accordance with a switch between the sunny place and the shady place. Consequently, when the transmittance of the external light rays always follows a change in the external light rays, it may be difficult for the user of the see-through display to visually recognize a target for display that is displayed on the see-through display due to a change in the transmittance of the external light rays.

An object of the present invention is to provide a transmittance control apparatus that can substantially prevent a state in which it is difficult for a user of a see-through display to visually recognize a target for display that is displayed on the see-through display.

Means for Solving Problem

A transmittance control apparatus according to one aspect includes a first identifier configured to identify, based on display information indicative of a target for display, a degree of lightness of the target for display; a second identifier configured to identify lightness of an environment in which a see-through display is disposed; a transmittance controller configured to: in a state in which the degree of lightness of the target for display does not fluctuate and the lightness of the environment fluctuates in a range less than or equal to a first lightness, reduce transmittance of the target for display that is displayed on the see-through display in accordance with an increase in the lightness of the environment; and control the transmittance of the target for display that is displayed on the see-through display at a first timing based on: a maximum lightness of the environment in a first period previous to the first timing and the degree of lightness of the target for display.

Effect of Invention

According to one aspect, it is possible to prevent a state in which it is difficult for a user of a see-through display to visually recognize a target for display that is displayed on the see-through display.

BRIEF DESCRIPTION OF THE DRAWINGS

FIG. 4 is a diagram showing an example of control information D.

MODES FOR CARRYING OUT THE INVENTION

A: First Embodiment

A1: Display Control System 1

Figure 1:
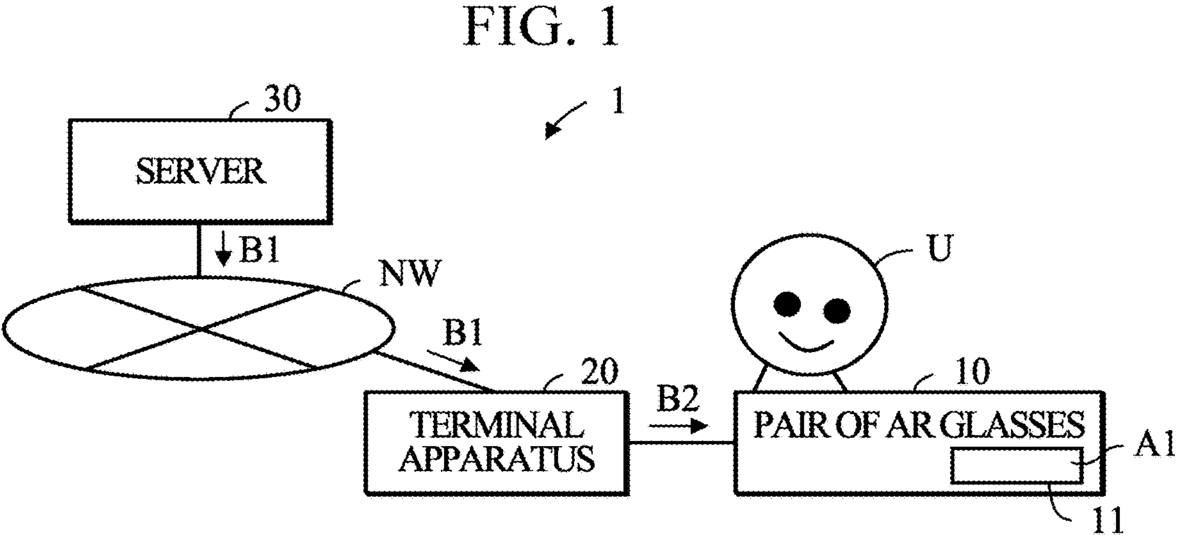
FIG. 1 is a schematic diagram showing a display control system 1.

FIG. 1 is a schematic diagram showing a display control system 1. The display control system 1 includes a pair of AR glasses 10, a terminal apparatus 20, and a server 30. AR is an abbreviation for augmented reality. AR denotes augmented reality. The pair of AR glasses 10 and the terminal apparatus 20 are communicable with each other. The terminal apparatus 20 and the server 30 are communicable with each other via a communication network NW.

The pair of AR glasses 10 is an example of a pair of see-through smart glasses. The pair of see-through smart glasses is an eyeglasses-type display. The pair of see-through smart glasses may be referred to as a pair of see-through X reality (XR) glasses or may be referred to as a see-through head mounted display (HMD).

The pair of AR glasses 10 and the pair of see-through smart glasses are each an example of a see-through display.

The see-through display is not limited to the pair of AR glasses 10 and is not limited to the pair of see-through smart glasses and may be a goggle-shaped see-through HMD.

The pair of AR glasses 10 is used by a user U. The pair of AR glasses 10 includes a see-through display unit 11. The see-through display unit 11 transmits external light rays representing the real world while displaying content A1. Thus, the pair of AR glasses 10 allows the user U to visually recognize the content A1 while causing the user U to visually recognize the real world. In other words, the pair of AR glasses 10 can provide the user U with augmented reality.

The terminal apparatus 20 acquires content information B1 from the server 30. The content information B1 is information indicative of the content A1. The terminal apparatus 20 generates content information B2 by modifying the content information B1. The content information B2 is information indicative of content A1 obtained by adjusting a degree of luminance of the content A1 indicated by the content information B1. The degree of luminance of the content A1 indicated by the content information B1 is adjusted based on a degree of lightness Li of the content A1 indicated by the content information B1 and lightness EB of an environment in which the pair of AR glasses 10 is disposed. The terminal apparatus 20 causes the pair of AR glasses 10 to display the content A1 indicated by the content information B2.

A degree of luminance Lu of the content A1 that is displayed on the pair of AR glasses 10 affects transmittance CT of the content A1 that is displayed on the pair of AR glasses 10. Here, the transmittance CT of the content A1 that is displayed on the pair of AR glasses 10 denotes transmittance of external light rays passing through the content A1 that is displayed on the pair of AR glasses 10.

With an increase in the degree of luminance Lu of the content A1 that is displayed on the pair of AR glasses 10, the transmittance CT of the content A1 that is displayed on the pair of AR glasses 10 reduces. Thus, with an increase in the degree of luminance Lu of the content A1 that is displayed on the pair of AR glasses 10, a degree of visibility of the content A1 that is displayed on the pair of AR glasses 10 is increased, but a degree of visibility of external light rays passing through the pair of AR glasses 10 is reduced.

On the other hand, with reduction in the degree of luminance Lu of the content A1 that is displayed on the pair of AR glasses 10, the transmittance CT of the content A1 that is displayed on the pair of AR glasses 10 is increased. Thus, with reduction in the degree of luminance Lu of the content A1 that is displayed on the pair of AR glasses 10, the degree of visibility of the content A1 that is displayed on the pair of AR glasses 10 is reduced, but the degree of visibility of the external light rays passing through the pair of AR glasses 10 is increased.

The terminal apparatus 20 controls the transmittance CT of the content A1 that is displayed on the pair of AR glasses 10 by controlling the degree of luminance Lu of the content A1 based on the degree of lightness Li of the content A1 and the lightness EB of the environment in which the pair of AR glasses 10 is disposed. The terminal apparatus 20 can control, based on the degree of lightness Li of the content A1 and the lightness EB of the environment in which the pair of AR glasses 10 is disposed, a balance between a degree of visibility of the content A1 displayed on the pair of AR glasses 10 and a degree of visibility of external light rays passing through the pair of AR glasses 10.

The content A1 is, for example, a still image such as a tourism guide map. The content A1 is not limited to the tourism guide map and may be text, a label, an advertisement, or video, for example. The content A1 is indicated by one or more types of data. For example, the content A1 is indicated by still image data, video data, or portable document format (PDF) data.

The content A1 is disposed in a virtual space, for example. When the pair of AR glasses 10 displays the content A1 disposed in the virtual space, the pair of AR glasses 10 can provide the user U with mixed reality (MR) in which the virtual space and the real world are mixed together. When the pair of AR glasses 10 provides mixed reality, the pair of AR glasses 10 may be referred to as a "pair of MR glasses."

The content A1 is an example of a target for display. The target for display is not limited to the content A1, and it may be a virtual object, for example. The virtual object is, for example, a virtual product. The virtual object is not limited to the virtual product, and it may be a virtual guide board or may be a virtual input device, for example. When the target for display is the virtual object, virtual object information indicative of the virtual object is used instead of the content information B1 indicative of the content A1. The content information B1 and the virtual object information are each an example of display information.

The terminal apparatus 20 is, for example, a smartphone. The terminal apparatus 20 is not limited to a smartphone, and it may be a tablet terminal or may be a laptop personal computer (PC), for example. The terminal apparatus 20 is carried by the user U, for example.

The server 30 transmits the content information B1. For example, the server 30 transmits the content information B1 to the terminal apparatus 20.

A2: Pair of AR Glasses 10

Figure 2:
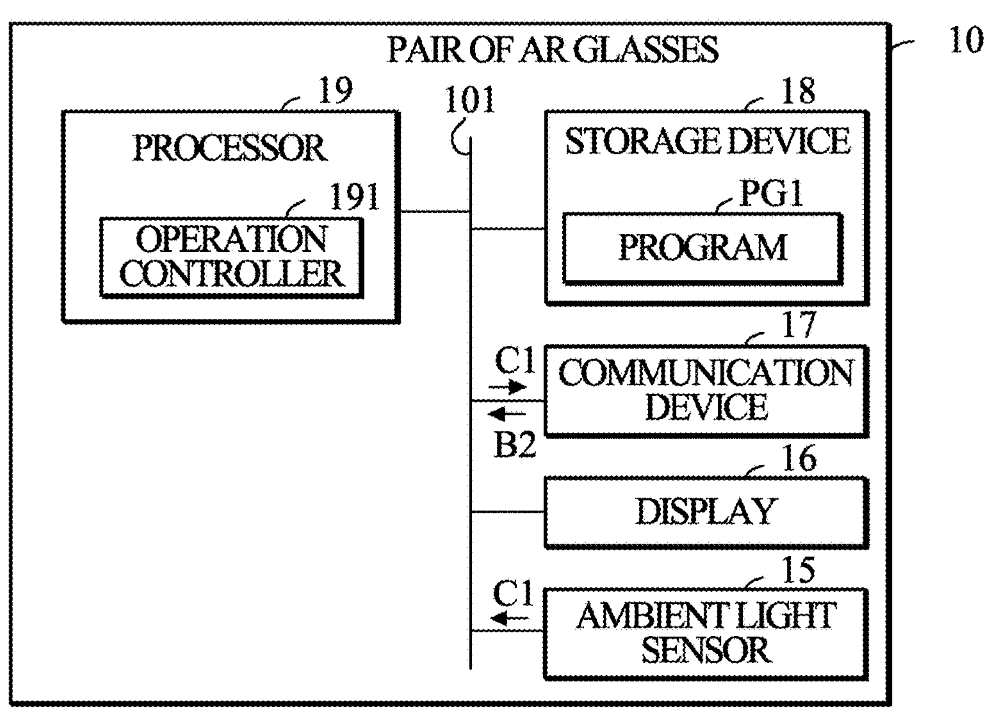
FIG. 2 is a diagram showing an example of a configuration of a pair of AR glasses 10.

FIG. 2 is a diagram showing an example of the pair of AR glasses 10. The pair of AR glasses 10 includes an ambient light sensor 15, a display 16, a communication device 17, a storage device 18, a processor 19, and a bus 101.

The bus 101 is wiring for communicating information. The bus 101 interconnects the ambient light sensor 15, the display 16, the communication device 17, the storage device 18, and the processor 19. The bus 101 may be constituted of a single bus or may be constituted of different buses that are each provided between devices.

The ambient light sensor 15 senses the lightness EB of the environment in which the pair of AR glasses 10 is disposed. Hereinafter, the "lightness EB of the environment in which the pair of AR glasses 10 is disposed" may be simply referred to as "lightness EB of the environment." The ambient light sensor 15 generates lightness information C1 based on a sense result of the lightness EB of the environment. The lightness information C1 is information indicative of the lightness EB of the environment.

The display 16 transmits external light rays representing the real world while displaying the content A1. The display 16 includes a display panel and a one-way mirror. The display panel is, for example, a liquid crystal panel or an organic electro-luminescent (EL) panel. The display panel emits light rays representing the content A1. The one-way mirror includes the see-through display unit 11. The one-way mirror reflects the light rays emitted by the display panel toward the eyes of the user U. The one-way mirror transmits the external light rays representing the real world to guide the external light rays representing the real world to the eyes of the user U.

The communication device 17 communicates with the terminal apparatus 20 wirelessly. The communication device 17 may communicate with the terminal apparatus 20 by wire.

The storage device 18 is a recording medium readable by the processor 19. The storage device 18 includes one or more memories. The storage device 18 includes, for example, a non-volatile memory and a volatile memory. The non-volatile memory is, for example, a read only memory (ROM), an erasable programmable read only memory (EPROM), and an electrically erasable programmable read only memory (EEPROM). The volatile memory is, for example, a random access memory (RAM). The storage device 18 stores a program PG1.

The processor 19 includes one or more central processing units (CPUs). The one or more CPUs are examples of one or more processors. The processor and the CPU are each an example of a computer.

The processor 19 reads the program PG1 from the storage device 18. The processor 19 executes the program PG1 to function as an operation controller 191. The operation controller 191 may be constituted of circuitry such as a digital signal processor (DSP), an application specific integrated circuit (ASIC), and a field programmable gate array (FPGA).

The operation controller 191 controls operations of the pair of AR glasses 10. For example, the operation controller 191 acquires the lightness information C1 from the ambient light sensor 15. The operation controller 191 causes the communication device 17 to transmit the lightness information C1 to the terminal apparatus 20. When the communication device 17 receives the content information B2 from the terminal apparatus 20, the operation controller 191 acquires the content information B2 from the communication device 17. The operation controller 191 causes the display 16 to display the content A1 indicated by the content information B2.

A3: Terminal Apparatus 20

Figure 3:
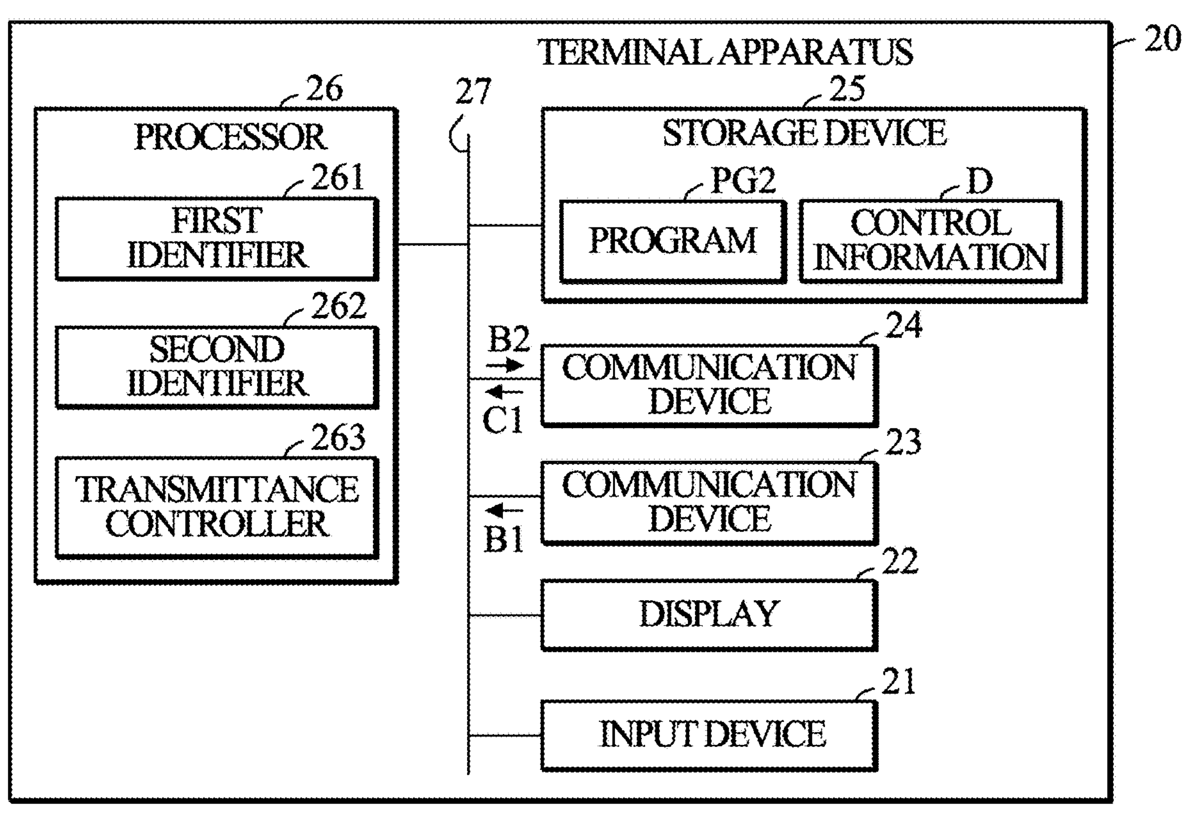
FIG. 3 is a diagram showing an example of a configuration of a terminal apparatus 20.

FIG. 3 is a diagram showing an example of a configuration of the terminal apparatus 20. The terminal apparatus 20 is an example of a transmittance control apparatus. The terminal apparatus 20 includes an input device 21, a display 22, a communication device 23, a communication device 24, a storage device 25, a processor 26, and a bus 27.

The bus 27 is wiring for communicating information. The bus 27 interconnects the input device 21, the display 22, the communication device 23, the communication device 24, the storage device 25, and the processor 26. The bus 27 may be constituted of a single bus or may be constituted of different buses that are each provided between devices.

The input device 21 includes a touch panel. The input device 21 may include not only the touch panel but also a plurality of operation keys. The input device 21 may not include a touch panel, but it may include a plurality of operation keys. The input device 21 receives operations performed by the user U.

The display 22 includes a display panel. The touch panel of the input device 21 is stacked on the display panel of the display 22. The display 22 displays a variety of types of information.

The communication device 23 communicates with the server 30 via the communication network NW. The communication device 23 may communicate with the server 30 not via the communication network NW.

The communication device 24 communicates with the pair of AR glasses 10 wirelessly. The communication device 24 may communicate with the pair of AR glasses 10 by wire.

The storage device 25 is a recording medium readable by the processor 26. The storage device 25 includes one or more memories. The storage device 25 includes, for example, a non-volatile memory and a volatile memory. The storage device 25 stores control information D and a program PG2.

The control information D is information for controlling the transmittance CT of the content A1 that is displayed on the pair of AR glasses 10. The control information D indicates an association between a degree of lightness Li of the content A1, lightness EB of the environment, and transmittance CT of the content A1 that is to be displayed on the pair of AR glasses 10. The control information D may indicate an association between a degree of lightness Li of the content A1, lightness EB of the environment, a degree of luminance Lu of the content A1 that is to be displayed on the pair of AR glasses 10, and transmittance CT of the content A1 that is to be displayed on the pair of AR glasses 10. Hereinafter, the "degree of luminance Lu of the content A1 that is to be displayed on the pair of AR glasses 10" may be simply referred to as a "degree of luminance Lu of the content A1." In addition, the "transmittance CT of the content A1 that is to be displayed on the pair of AR glasses 10" may be simply referred to as "transmittance CT of the content A1."

FIG. 4 is a diagram showing an example of the control information D. The control information D shown in FIG. 4 indicates an association between a degree of lightness Li of the content A1, lightness EB of the environment, a degree of luminance Lu of the content A1, and transmittance CT of the content A1. Hereinafter, an "association between a value of the degree of lightness Li of the content A1, a value of the lightness EB of the environment, a value of the degree of luminance Lu of the content A1, and a value of the transmittance CT of the content A1" may be simply referred to as a "first association." The values indicated by the control information D are determined based on results of a verification experiment conducted in advance, for example. In the verification experiment, in a state in which a value of the degree of lightness Li of the content A1, a value of the lightness EB of the environment, a value of the degree of luminance Lu of the content A1, and a value of the transmittance CT of the content A1 are each changed, a plurality of subjects each wearing the pair of AR glasses 10 determine first associations that cause both the content A1 and the real world to be visually recognized with ease. The first associations determined by the verification experiment are reflected in the values indicated by the control information D. The values indicated by the control information D are not limited to the values shown in FIG. 4 and may be changed as appropriate. For example, both values of the degree of luminance Lu of the content A1 and values of the transmittance CT of the content A1 that are indicated by the control information D may be customized for the user U. The values indicated by the control information D may be determined by a designer rather than being based on the results of a verification experiment conducted in advance.

The degree of lightness Li of the content A1 is compared with determination values E1 and E2. The determination value E1 is less than the determination value E2.

Figure 5:
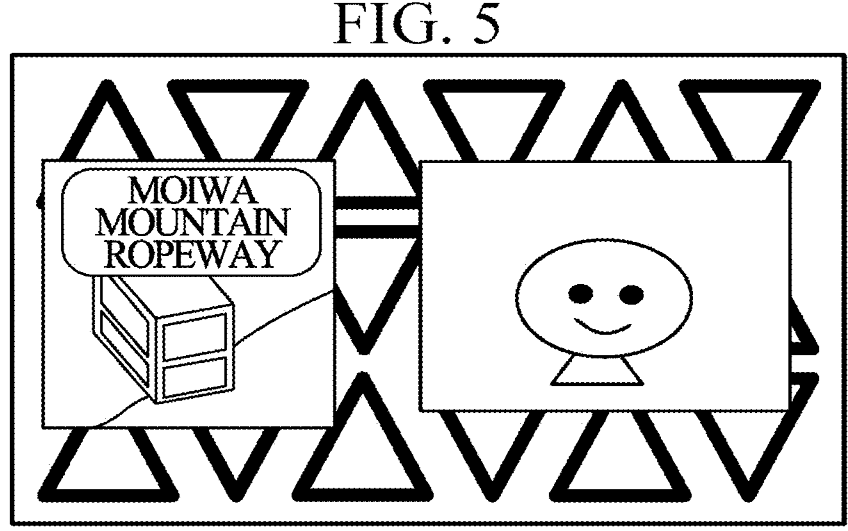
FIG. 5 is a diagram showing an example of content A1.
Figure 6:
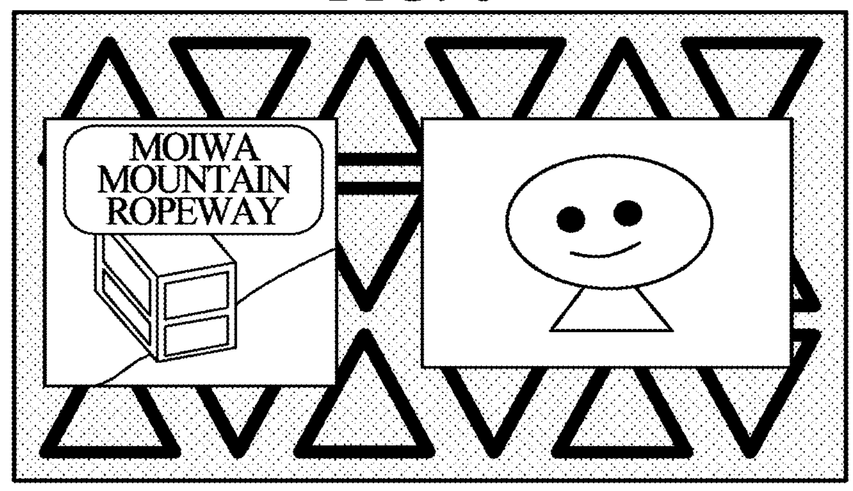
FIG. 6 is a diagram showing another example of the content A1.
Figure 7:
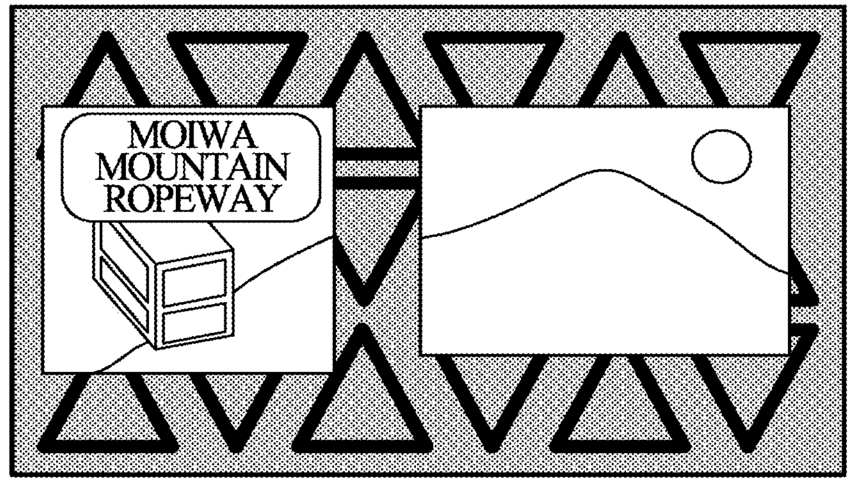
FIG. 7 is a diagram showing yet another example of the content A1.

FIG. 5 is a diagram showing an example of content A1 having a degree of lightness Li greater than or equal to the determination value E2. FIG. 6 is a diagram showing an example of content A1 having a degree of lightness Li greater than or equal to the determination value E1 and less than the determination value E2. FIG. 7 is a diagram showing an example of content A1 having a degree of lightness Li less than the determination value E1. Among the contents A1 shown in FIG. 5 to FIG. 7, the content A1 shown in FIG. 5 is the lightest and is closest to white. Among the contents A1 shown in FIG. 5 to FIG. 7, the content A1 shown in FIG. 7 is the darkest and is closest to black.

The explanation now returns to FIG. 4. The degree of luminance Lu of the content A1 indicates, by percentage, a ratio of a degree of luminance of the content A1 that is to be displayed on the pair of AR glasses 10 to the degree of luminance of the content A1 indicated by the content information B1. For example, when the degree of luminance of the content A1 that is to be displayed on the pair of AR glasses 10 is equal to the degree of luminance of the content A1 indicated by the content information B1, the degree of luminance Lu of the content A1 is equal to 100%.

The transmittance CT of the content A1 is obtained by subtracting the degree of luminance Lu of the content A1 from 100%. The degree of luminance Lu of the content A1 can be obtained by subtracting the transmittance CT of the content A1 from 100%. Thus, either the transmittance CT of the content A1 or the degree of luminance Lu of the content A1 may be omitted.

The explanation now returns to FIG. 3. The processor 26 includes one or more CPUs. The processor 26 is another example of the transmittance control apparatus. The processor 26 reads the program PG2 from the storage device 25. The processor 26 executes the program PG2 to function as a first identifier 261, a second identifier 262, and a transmittance controller 263. At least one of the first identifier 261, the second identifier 262, and the transmittance controller 263 may be constituted of circuitry such as a DSP, an ASIC, and an FPGA.

The first identifier 261 identifies the degree of lightness Li of the content A1 based on the content information B1. For example, the first identifier 261 first acquires the content information B1 from the server 30 via the communication device 23. Subsequently, the first identifier 261 identifies, as the degree of lightness Li of the content A1, an average of degrees of lightness of areas that constitute the entire content A1 indicated by the content information B1. The first identifier 261 may identify, as the degree of lightness Li of the content A1, an average of degrees of luminance of the areas that constitute the entire content A1 indicated by the content information B1.

The degree of lightness Li of the content A1 is not limited to the average of degrees of lightness of the areas that constitute the entire content A1 and may be an average of degrees of lightness of areas that constitute a part of the content A1. For example, the first identifier 261 first divides the content A1 into a plurality of regions. Subsequently, the first identifier 261 identifies, as the degree of lightness Li of the content A1, an average of degrees of lightness of areas that constitute a region among the plurality of regions.

The degree of lightness Li of the content A1 may be an average of degrees of luminance of areas that constitute a part of the content A1. For example, the first identifier 261 first divides the content A1 into a plurality of regions. Subsequently, the first identifier 261 identifies, as the degree of lightness Li of the content A1, an average of degrees of luminance of areas that constitute a region among the plurality of regions.

The second identifier 262 identifies the lightness EB of the environment. For example, the second identifier 262 identifies the lightness EB of the environment based on the lightness information C1 generated by the pair of AR glasses 10. For example, the second identifier 262 first acquires the lightness information C1 from the pair of AR glasses 10 via the communication device 24. Subsequently, the second identifier 262 identifies, as the lightness EB of the environment, the lightness indicated by the lightness information C1.

The method for identifying the lightness EB of the environment is not limited to the method for identifying the lightness EB of the environment based on the lightness information C1.

The second identifier 262 may identify the lightness EB of the environment based on weather information indicative of an amount of solar irradiance in an area in which the pair of AR glasses 10 is disposed. For example, when the operation controller 191 of the pair of AR glasses 10 generates first location information indicative of a location of the pair of AR glasses 10 by use of a global positioning system (GPS) or the like, the second identifier 262 of the terminal apparatus 20 first acquires the first location information from the pair of AR glasses 10. Subsequently, the second identifier 262 uses the first location information to acquire the weather information, which indicates the amount of solar irradiance in the area in which the pair of AR glasses 10 is disposed, from a weather information server, for example. Alternatively, when the second identifier 262 can identify a location of the terminal apparatus 20 by use of the GPS or the like, the second identifier 262 may use the location of the terminal apparatus 20 as the location of the pair of AR glasses 10 to acquire the weather information indicative of the amount of solar irradiance in the area in which the pair of AR glasses 10 is disposed. The second identifier 262 identifies, as the lightness EB of the environment, a value obtained by multiplying the amount of solar irradiance indicated by the weather information and a conversion coefficient together.

The second identifier 262 may identify the lightness EB of the environment based on both the lightness information C1 and the weather information. For example, the second identifier 262 identifies an initial value of the lightness EB of the environment based on the weather information as described above. Subsequently, the second identifier 262 identifies latest lightness EB of the environment by updating the initial value of the lightness EB of the environment based on latest lightness information C1.

As a method for updating the initial value of the lightness EB of the environment based on the latest lightness information C1, either a first updating method or a second updating method is used, for example.

In the first updating method, the second identifier 262 identifies the latest lightness EB of the environment by changing the initial value of the lightness EB of the environment to a value of lightness indicated by the latest lightness information C1.

In the second updating method, the second identifier 262 identifies, as the latest lightness EB of the environment, a value obtained by adding an amount of change in lightness indicated by lightness information C1 to the initial value of the lightness EB of the environment. The amount of change in lightness indicated by lightness information C1 is a value obtained by subtracting a value of lightness, which is indicated by lightness information C1 at a point in time at which the initial value of the lightness EB of the environment is identified, from a value of lightness indicated by the latest lightness information C1.

When the second identifier 262 identifies the lightness EB of the environment, the second identifier 262 stores an environment-lightness information set EBI indicative of the lightness EB of the environment in the storage device 25. In addition, the second identifier 262 deletes, from the storage device 25, an environment-lightness information set EBI that has an elapsed period greater than a storage period, the elapsed period being a period that has elapsed since a timing at which the environment-lightness information set EBI was stored in the storage device 25. The storage period is, for example, 5 seconds. The storage period is not limited to 5 seconds and may be a period less than 5 seconds or may be a period greater than 5 seconds.

The transmittance controller 263 controls, based on the degree of lightness Li of the content A1 and the lightness EB of the environment, the transmittance CT of the content A1 that is displayed on the pair of AR glasses 10. The transmittance controller 263 acquires the degree of lightness Li of the content A1 from the first identifier 261. The transmittance controller 263 acquires the environment-lightness information set EBI indicative of the lightness EB of the environment from the storage device 25.

The transmittance controller 263 controls the degree of luminance Lu of the content A1 that is displayed on the pair of AR glasses 10 to control the transmittance CT of the content A1 that is displayed on the pair of AR glasses 10. The transmittance controller 263 increases the degree of luminance Lu of the content A1 that is displayed on the pair of AR glasses 10 to reduce the transmittance CT of the content A1 that is displayed on the pair of AR glasses 10. The transmittance controller 263 reduces the degree of luminance Lu of the content A1 that is displayed on the pair of AR glasses 10 to increase the transmittance CT of the content A1 that is displayed on the pair of AR glasses 10.

In a state in which the degree of lightness Li of the content A1 does not fluctuate and the lightness EB of the environment fluctuates in a range less than or equal to a first lightness, the transmittance controller 263 reduces the transmittance CT of the content A1 in accordance with an increase in the lightness EB of the environment. Reduction in the transmittance CT of the content A1 causes improvement in visibility of the content A1. The first lightness is, for example, 0.5 kiloluxes indicated by the control information D shown in FIG. 4. The first lightness is not limited to 0.5 kiloluxes and may be less than 0.5 kiloluxes or may be greater than 0.5 kiloluxes.

The transmittance controller 263 determines a first timing T1 at which the transmittance CT of the content A1 is controlled. For example, the transmittance controller 263 determines, as the first timing T1, a timing after the second identifier 262 starts to continually store environment-lightness information sets EBI in the storage device 25. The transmittance controller 263 may update the first timing T1 in response to an elapse of time.

At the first timing T1, the transmittance controller 263 controls the transmittance CT of the content A1 based on: a maximum lightness EBmax of the lightness EB of the environment in a first period DT1 previous to the first timing T1, and the degree of lightness Li of the content A1.

Figures 8, 9:
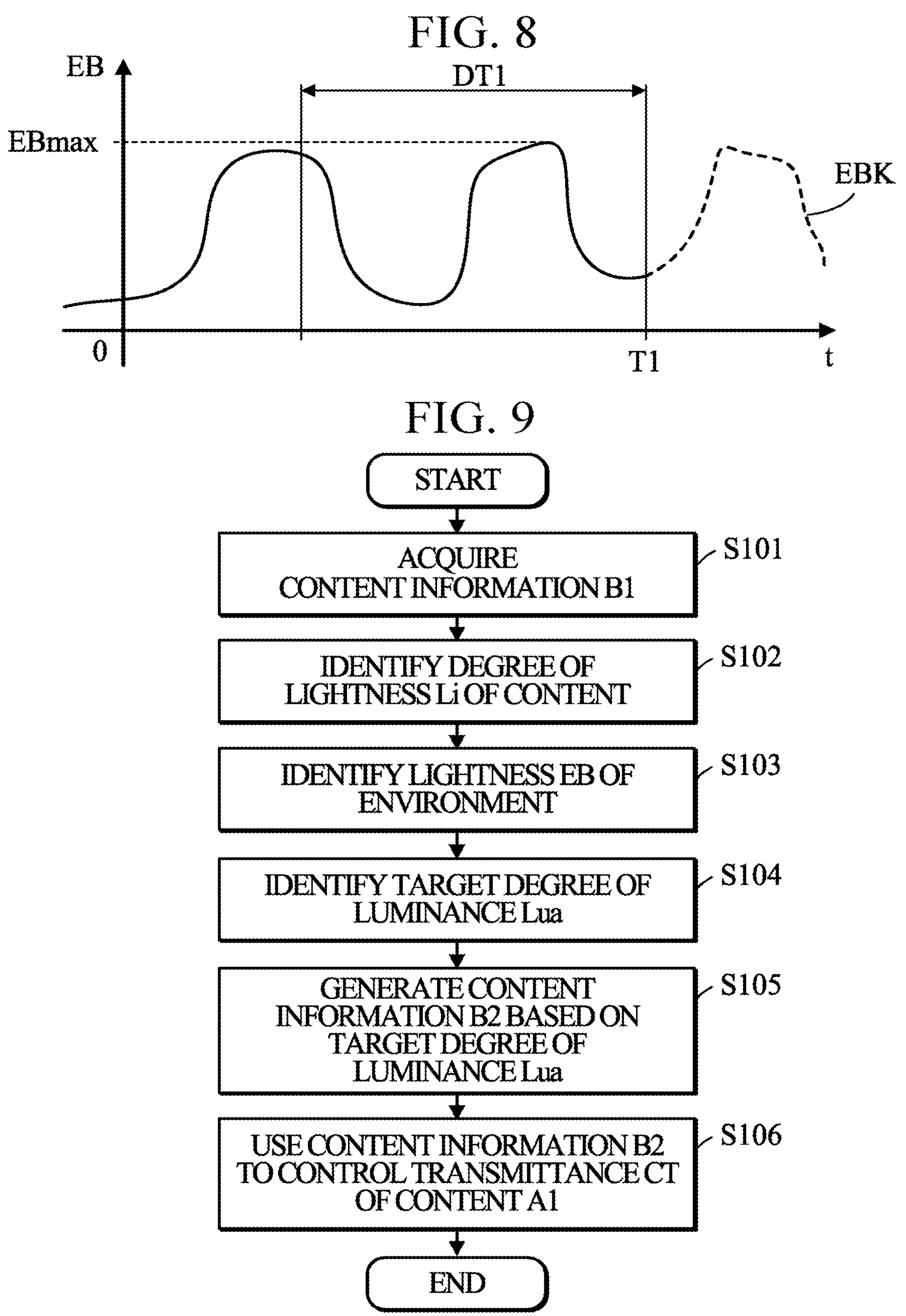
FIG. 8 is a diagram showing an example of a maximum lightness EBmax.
FIG. 9 is a diagram explaining an operation of the terminal apparatus 20.

FIG. 8 is a diagram showing an example of the maximum lightness EBmax in a state in which the user U who wears the pair of AR glasses 10 alternately passes through a sunny place and a shady place. In FIG. 8, a vertical axis indicates the lightness EB of the environment. A horizontal axis indicates time t. A dashed line EBK represents a transition of the lightness EB of the environment in the future.

Lightness EB of the environment in a state in which the user U who wears the pair of AR glasses 10 moves through a sunny place is greater than lightness EB of the environment in a state in which the user U who wears the pair of AR glasses 10 moves through a shady place. In the example shown in FIG. 8, when the first timing T1 occurs in a period during which the user U who wears the pair of AR glasses 10 moves through the shady place, the transmittance controller 263 uses, as the maximum lightness EBmax, lightness EB of the environment in a period during which the user U who wears the pair of AR glasses 10 moves through the sunny place. Thus, it is possible to substantially prevent a change in transmittance CT of the content A1 caused by a change in lightness EB of the environment.

At the first timing T1, the transmittance controller 263 reads an environment-lightness information set EBIa indicative of the maximum lightness EBmax from among the environment-lightness information sets EBI stored in the storage device 25. The maximum lightness EBmax is the maximum lightness of the environment in the lightness EB of the environment in the first period DT1 previous to the first timing T1. The first period DT1 is a period from a timing, at which the oldest environment-lightness information set EBI among the environment-lightness information sets EBI stored in the storage device 25 is stored, to the first timing T1.

Subsequently, the transmittance controller 263 refers to the control information D shown in FIG. 4 to identify, as a target degree of luminance Lua, a degree of luminance Lu of the content A1 that is in association with both the lightness EB (the maximum lightness EBmax) of the environment indicated by the environment-lightness information set EBIa and the degree of lightness Li of the content A1. It is noted that, since the transmittance CT of the content A1 is uniquely identified from the degree of luminance Lu of the content A1, identification of the target degree of luminance Lua denotes identification of target transmittance of the content A1.

The transmittance controller 263 modifies the content information B1 based on the target degree of luminance Lua to generate the content information B2. The content information B2 indicates content A1 obtained by changing the degree of luminance of the content A1 indicated by the content information B1 to the target degree of luminance Lua. Here, the degree of luminance of the content A1 indicated by the content information B1 is, for example, the average of degrees of luminance of the areas that constitute the entire content A1 indicated by the content information B1. Thus, in the content A1 indicated by the content information B2, an average of degrees of luminance of areas that constitute the entire content A1 indicated by the content information B1 is equal to the target degree of luminance Lua. In this case, in the control information D, the transmittance CT of the content A1 may be omitted.

The transmittance controller 263 may refer to the control information D shown in FIG. 4 to identify, as the target transmittance, transmittance CT of the content A1 that is in association with both the lightness EB (the maximum lightness EBmax) of the environment indicated by the environment-lightness information set EBIa and the degree of lightness Li of the content A1. In this case, the transmittance controller 263 identifies the target degree of luminance Lua by subtracting the target transmittance from 100%. Subsequently, the transmittance controller 263 modifies the content information B1 based on the target degree of luminance Lua to generate the content information B2. In this case, in the control information D, the degree of luminance Lu of the content A1 may be omitted.

The transmittance controller 263 provides the content information B2 to the pair of AR glasses 10 via the communication device 24 to control the transmittance CT of the content A1 that is displayed by the pair of AR glasses 10.

A4: Description of Operation

FIG. 9 is a diagram explaining an operation of the terminal apparatus 20. At step S101, the first identifier 261 acquires the content information B1 from the server 30. When the storage device 25 stores the content information B1, the first identifier 261 may acquire the content information B1 from the storage device 25.

Subsequently, at step S102, the first identifier 261 identifies the degree of lightness Li of the content A1 based on the content information B1. Alternatively, step S102 may be executed before step S101.

Subsequently, at step S103, the second identifier 262 identifies the lightness EB of the environment. For example, the second identifier 262 identifies the lightness EB of the environment based on the lightness information C1 generated by the pair of AR glasses 10. The second identifier 262 stores an environment-lightness information set EBI indicative of the lightness EB of the environment in the storage device 25. In addition, the second identifier 262 deletes, from the storage device 25, an environment-lightness information set EBI that has an elapsed period greater than the storage period, the elapsed period being a period that has elapsed since a timing at which the environment-lightness information set EBI was stored in the storage device 25.

Subsequently, at step S104, the transmittance controller 263 identifies the target degree of luminance Lua.

First, at the first timing T1, the transmittance controller 263 reads an environment-lightness information set EBIa indicative of the maximum lightness EBmax from among environment-lightness information sets EBI stored in the storage device 25. Subsequently, the transmittance controller 263 refers to the control information D to identify, as the target degree of luminance Lua, a degree of luminance Lu of the content A1 that is in association with both the lightness EBmax of the environment indicated by the environment-lightness information set EBIa and the degree of lightness Li of the content A1.

Subsequently, at step S105, the transmittance controller 263 generates the content information B2 based on the target degree of luminance Lua. The content information B2 indicates the content A1 obtained by changing the degree of luminance of the content A1 indicated by the content information B1 to the target degree of luminance Lua.

Subsequently, at step S106, the transmittance controller 263 uses the content information B2 to control the transmittance CT of the content A1 that is displayed by the pair of AR glasses 10. For example, the transmittance controller 263 provides the content information B2 to the pair of AR glasses 10 via the communication device 24 to cause the pair of AR glasses 10 to display the content A1 indicated by the content information B2.

A5: Summary of First Embodiment

The first identifier 261 identifies the degree of lightness Li of the content A1 based on the content information B1 indicative of the content A1. The second identifier 262 identifies the lightness EB of the environment in which the pair of AR glasses 10 is disposed. In a state in which the degree of lightness Li of the content A1 does not fluctuate and the lightness EB of the environment fluctuates in the range less than or equal to the first lightness, the transmittance controller 263 reduces the transmittance CT of the content A1 that is displayed on the pair of AR glasses 10 in accordance with an increase in the lightness EB of the environment.

With reduction in the transmittance CT of the content A1 that is displayed on the pair of AR glasses 10, the degree of luminance of the content A1 that is displayed on the pair of AR glasses 10 increases. With an increase in the degree of luminance of the content A1 that is displayed on the pair of AR glasses 10, a visibility ratio of the content A1 that is displayed on the pair of AR glasses 10 increases. Thus, with reduction in the transmittance CT of the content A1 that is displayed on the pair of AR glasses 10, the visibility ratio of the content A1 that is displayed on the pair of AR glasses 10 increases. Here, in a state in which the degree of lightness Li of the content A1 does not fluctuate and the lightness EB of the environment fluctuates in the range less than or equal to the first lightness, the transmittance controller 263 reduces the transmittance CT of the content A1 that is displayed on the pair of AR glasses 10 in accordance with an increase in the lightness EB of the environment. Thus, as the lightness EB of the environment for adjusting the transmittance of the content A1 increases, the probability of improvement in visibility of the content A1 increases.

At the first timing T1, the transmittance controller 263 controls, based on the maximum lightness of the lightness EB of the environment in a first period DT1 previous to the first timing T1 and the degree of lightness Li of the content A1, the transmittance CT of the content A1 that is displayed on the pair of AR glasses 10. Thus, it is possible to maintain visibility of the content A1 and to substantially prevent an unnecessary change in the transmittance CT of the content A1 caused by a change in the lightness EB of the environment. Thus, it is possible to substantially prevent a state in which it is difficult for the user U of the pair of AR glasses 10 to visually recognize the content A1 that is displayed on the pair of AR glasses 10.

B: Modifications

The following are examples of modifications of the embodiment described above. Two or more modifications freely selected from the following modifications may be combined as long as no conflict arises from such combination.

B1: First Modification

In the first embodiment, the transmittance controller 263 may determine the first timing T1 based on an amount G1 of change in the lightness EB of the environment. The amount G1 of change in the lightness EB of the environment denotes an absolute value of an amount of change in the lightness EB of the environment in a unit time period. The unit time period is, for example, 0.5 seconds. The unit time period is not limited to 0.5 seconds, and it may be a time period less than 0.5 seconds, or it may be a time period greater than 0.5 seconds. The transmittance controller 263 identifies the amount G1 of change in the lightness EB of the environment each time the unit time period elapses.

The transmittance controller 263 uses, as a method for determining the first timing T1, a first determination method, for example. In the first determination method, the transmittance controller 263 determines the first timing T1 based on a timing Ta at which the amount G1 of change in the lightness EB of the environment exceeds a first threshold F1.

For example, when the amount G1 of change in the lightness EB of the environment exceeds the first threshold F1, the transmittance controller 263 determines, as the first timing T1, the timing Ta at which the amount G1 of change in the lightness EB of the environment exceeds the first threshold F1. In addition, when the amount G1 of change in the lightness EB of the environment does not exceed the first threshold F1, the transmittance controller 263 maintains the transmittance CT of the content A1 that is displayed on the pair of AR glasses 10.

Figure 10:
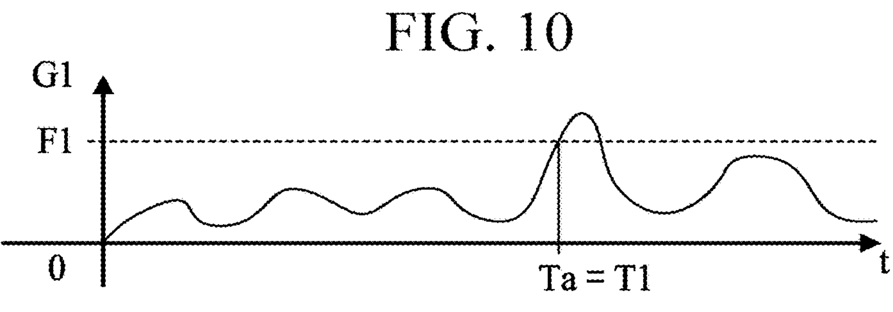
FIG. 10 is a diagram showing an example of determination of a first timing T1.

FIG. 10 is a diagram showing an example of determining, as the first timing T1, the timing Ta at which the amount G1 of change in the lightness EB of the environment exceeds the first threshold F1. In FIG. 10, a vertical axis indicates the amount G1 of change in the lightness EB of the environment. A horizontal axis indicates time t. In FIG. 10, the timing Ta at which the amount G1 of change in the lightness EB of the environment exceeds the first threshold F1 is equal to the first timing T1.

In the first determination method, the transmittance controller 263 may determine, as the first timing T1, a timing at which a first predetermined time period has elapsed since the timing Ta. The first predetermined time period is, for example, 0.2 seconds. The first predetermined time period is not limited to 0.2 seconds, and it may be a time period less than 0.2 seconds, or it may be a time period greater than 0.2 seconds. The method for determining, as the first timing T1, the timing at which the first predetermined time period has elapsed since the timing Ta is an example of a method for determining the first timing T1 based on a transition of the amount G1 of change in the lightness EB of the environment.

According to the first modification, the transmittance controller 263 determines the first timing T1 based on the amount G1 of change in the lightness EB of the environment. Thus, it is possible to determine the first timing T1 based either on a magnitude of the amount G1 of change in the lightness EB of the environment or on a transition of the amount G1 of change in the lightness EB of the environment, for example. Consequently, it is possible to determine a timing at which the transmittance CT of the content A1 is adjusted based either on a magnitude of the amount G1 of change in the lightness EB of the environment or on a transition of the amount G1 of change in the lightness EB of the environment, for example.

In addition, the transmittance controller 263 determines the first timing T1 based on the timing Ta at which the amount G1 of change in the lightness EB of the environment exceeds the first threshold F1. Thus, it is possible to reduce the frequency of adjusting the transmittance CT of the content A1 compared to a configuration in which the transmittance CT of the content A1 is constantly adjusted regardless of the magnitude of the amount G1 of change in the lightness EB of the environment. Consequently, it is possible to substantially prevent the transmittance CT of the content A1 from being adjusted with excessive frequency.

In addition, when the amount G1 of change in the lightness EB of the environment exceeds the first threshold F1, the transmittance controller 263 determines, as the first timing T1, the timing Ta at which the amount G1 of change in the lightness EB of the environment exceeds the first threshold F1. When the amount G1 of change in the lightness EB of the environment does not exceed the first threshold F1, the transmittance controller 263 maintains the transmittance CT of the content A1 that is displayed on the pair of AR glasses 10. The timing Ta at which the amount G1 of change in the lightness EB of the environment exceeds the first threshold F1 is likely to be a timing at which the transmittance CT of the content A1 needs to be adjusted. Thus, it is possible to execute adjustment of the transmittance CT of the content A1 at a necessary timing and to substantially prevent adjustment of the transmittance CT of the content A1 from being executed with excessive frequency.

B2: Second Modification

In the first modification, the transmittance controller 263 may use, as a method for determining the first timing T1 based on the amount G1 of change in the lightness EB of the environment, a second determination method instead of the first determination method.

In the second determination method, the transmittance controller 263 determines the first timing T1 based on a timing Tb at which a first maintenance period H1 exceeds a first determination period J1. Here, the first maintenance period H1 is a period during which the amount G1 of change in the lightness EB of the environment maintains a state from a point in time at which the amount G1 of change in the lightness EB of the environment becomes less than or equal to a second threshold F2 after the amount G1 of change in the lightness EB of the environment exceeds the second threshold F2, the state being a state in which the amount G1 of change in the lightness EB of the environment is less than or equal to the second threshold F2. The first determination period J1 is, for example, 1.5 seconds. The first determination period J1 is not limited to 1.5 seconds and may be a period less than 1.5 seconds or may be a period greater than 1.5 seconds.

For example, when the first maintenance period H1 exceeds the first determination period J1, the transmittance controller 263 determines, as the first timing T1, the timing Tb at which the first maintenance period H1 exceeds the first determination period J1. In addition, when the first maintenance period H1 does not exceed the first determination period J1, the transmittance controller 263 maintains the transmittance CT of the content A1 that is displayed on the pair of AR glasses 10.

Figure 11:
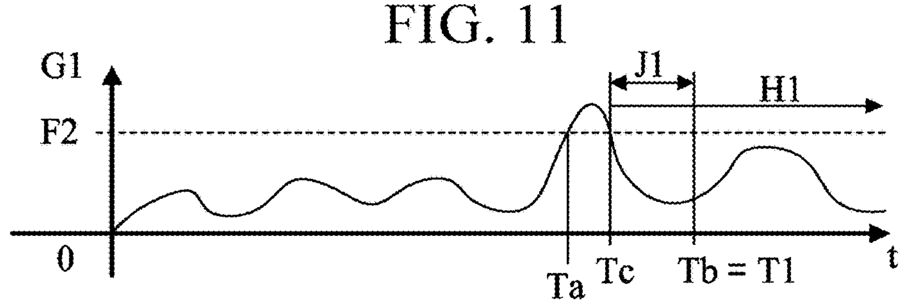
FIG. 11 is a diagram showing another example of the determination of the first timing T1.

FIG. 11 is a diagram showing an example of determining, as the first timing T1, the timing Tb at which the first maintenance period H1 exceeds the first determination period J1. In FIG. 11, a vertical axis indicates the amount G1 of change in the lightness EB of the environment. A horizontal axis indicates time t. The first maintenance period H1 starts from a timing Tc. The timing Tc is a timing at which the amount G1 of change in the lightness EB of the environment becomes less than or equal to the second threshold F2 after the amount G1 of change in the lightness EB of the environment exceeds the second threshold F2. In FIG. 11, the timing Tb at which the first maintenance period H1 exceeds the first determination period J1 is equal to the first timing T1.

In the second determination method, the transmittance controller 263 may determine, as the first timing T1, a timing at which a second predetermined time period has elapsed since the timing Tb. The second predetermined time period is, for example, 0.2 seconds. The second predetermined time period is not limited to 0.2 seconds and may be a time period less than 0.2 seconds or may be a time period greater than 0.2 seconds. The method for determining, as the first timing T1, the timing at which the second predetermined time period has elapsed since the timing Tb is another example of the method for determining the first timing T1 based on a transition of the amount G1 of change in the lightness EB of the environment.

According to the second modification, the transmittance controller 263 determines the first timing T1 based on the timing Tb at which the first maintenance period H1 exceeds the first determination period J1. Thus, it is possible to adjust the transmittance CT of the content A1 after the lightness EB of the environment is settled. Consequently, it is possible to substantially prevent adjustment of the transmittance CT of the content A1 from being caused by noises of the lightness EB of the environment, for example. As a result, it is possible to substantially prevent the transmittance CT of the content A1 from being adjusted with excessive frequency.

In addition, when the first maintenance period H1 exceeds the first determination period J1, the transmittance controller 263 determines, as the first timing T1, the timing Tb at which the first maintenance period H1 exceeds the first determination period J1. When the first maintenance period H1 does not exceed the first determination period J1, the transmittance controller 263 maintains the transmittance CT of the content A1 that is displayed on the pair of AR glasses 10. Thus, in response to the lightness EB of the environment being settled, adjustment of the transmittance CT of the content A1 can be immediately executed, and it is possible to substantially prevent adjustment of the transmittance CT of the content A1 from being executed with excessive frequency.

B3: Third Modification

In the first embodiment and in the first modification to the second modification, the first timing T1 may be determined based on an amount G2 of change in a location of the pair of AR glasses 10. The amount G2 of change in the location of the pair of AR glasses 10 denotes an absolute value of an amount of change in a location of the pair of AR glasses 10 in the unit time period.

Figure 12:
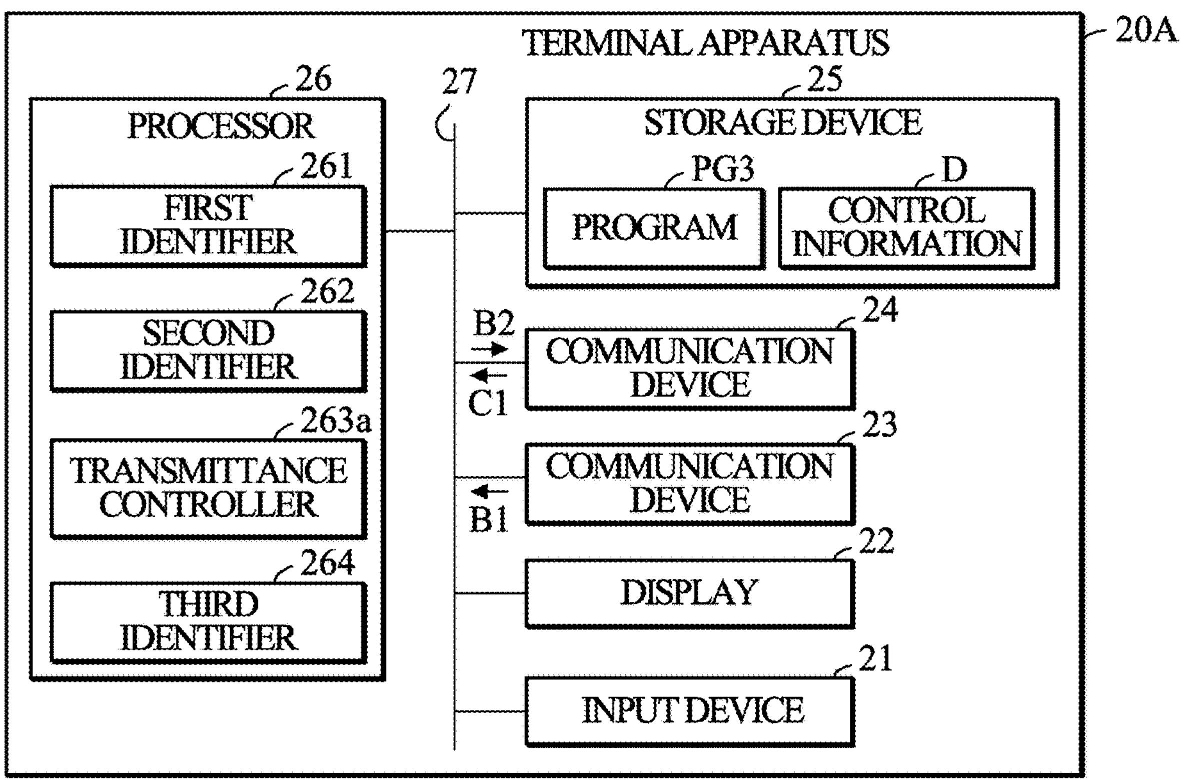
FIG. 12 is a diagram showing an example of a terminal apparatus 20A according to a third modification.

FIG. 12 is a diagram showing an example of a terminal apparatus 20A according to a third modification. The terminal apparatus 20A is used in place of the terminal apparatus 20. The terminal apparatus 20A, as well as the terminal apparatus 20, is a smartphone, for example. The terminal apparatus 20A is not limited to a smartphone, and it may be a tablet terminal or a laptop PC, for example. The terminal apparatus 20A is carried by the user U, for example.

The terminal apparatus 20A mainly differs from the terminal apparatus 20 in that: the terminal apparatus 20A includes a third identifier 264, the terminal apparatus 20A includes a transmittance controller 263*a* in place of the transmittance controller 263, and the terminal apparatus 20A stores a program PG3 in place of the program PG2. Hereinafter, the terminal apparatus 20A will be described focusing on different points from the terminal apparatus 20.

The processor 26 of the terminal apparatus 20A reads the program PG3 from the storage device 25 of the terminal apparatus 20A. The processor 26 of the terminal apparatus 20A executes the program PG3 to functions as the first identifier 261, the second identifier 262, the transmittance controller 263*a*, and the third identifier 264. At least one of the first identifier 261, the second identifier 262, the transmittance controller 263*a*, and the third identifier 264 may be constituted of circuitry such as a DSP, an ASIC, and an FPGA.

The third identifier 264 identifies the location of the pair of AR glasses 10. For example, when the operation controller 191 of the pair of AR glasses 10 uses the GPS or the like to generate the first location information indicative of the location of the pair of AR glasses 10, the third identifier 264 first acquires the first location information from the pair of AR glasses 10. Subsequently, the third identifier 264 identifies a location indicated by the first location information as the location of the pair of AR glasses 10. Alternatively, when the third identifier 264 can identify a location of the terminal apparatus 20A by use of the GPS or the like, the third identifier 264 may identify the location of the terminal apparatus 20A as the location of the pair of AR glasses 10.

The transmittance controller 263*a* has the functions of the transmittance controller 263. In addition, the transmittance controller 263*a* determines the first timing T1 based on the amount G2 of change in the location of the pair of AR glasses 10. The transmittance controller 263*a* identifies the amount G2 of change in the location of the pair of AR glasses 10 every time the unit time period elapses.

When the amount G2 of change in the location of the pair of AR glasses 10 exceeds a third threshold F3, the transmittance controller 263*a* determines, as the first timing T1, a timing Td at which the amount G2 of change in the location of the pair of AR glasses 10 exceeds the third threshold F3. In addition, when the amount G2 of change in the location of the pair of AR glasses 10 does not exceed the third threshold F3, the transmittance controller 263*a* maintains the transmittance CT of the content A1 that is displayed on the pair of AR glasses 10.

Figure 13:
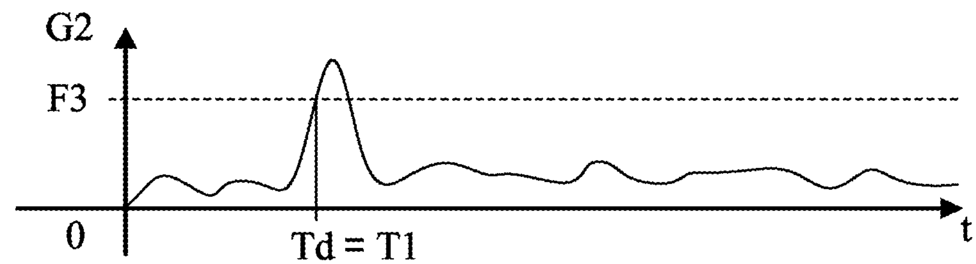
FIG. 13 is a diagram showing yet another example of the determination of the first timing T1.

FIG. 13 is a diagram showing an example of determining, as the first timing T1, the timing Td at which the amount G2 of change in the location of the pair of AR glasses 10 exceeds the third threshold F3. In FIG. 13, a vertical axis indicates the amount G2 of change in the location of the pair of AR glasses 10. A horizontal axis indicates time t. In FIG. 13, the timing Td at which the amount G2 of change in the location of the pair of AR glasses 10 exceeds the third threshold F3 is equal to the first timing T1.

The transmittance controller 263*a* may determine, as the first timing T1, a timing at which a third predetermined time period has elapsed since the timing Td. The third predetermined time period is, for example, 0.2 seconds. The third predetermined time period is not limited to 0.2 seconds and may be a time period less than 0.2 seconds or may be a time period greater than 0.2 seconds. The method for determining, as the first timing T1, the timing at which the third predetermined time period has elapsed since the timing Td is an example of a method for determining the first timing T1 based on a transition of the amount G2 of change in the location of the pair of AR glasses 10.

According to the third modification, the third identifier 264 identifies the location of the pair of AR glasses 10. The transmittance controller 263*a* determines the first timing T1 based on the amount G2 of change in the location of the pair of AR glasses 10. When the location of the pair of AR glasses 10 is changed, the lightness EB of the environment in which the pair of AR glasses 10 is disposed may change. Thus, when there is a probability that the lightness EB of the environment in which the pair of AR glasses 10 is disposed changes, the transmittance controller 263*a* can determine a timing at which the transmittance CT of the content A1 is adjusted.

B4: Fourth Modification

In the third modification, the transmittance controller 263*a* may determine the first timing T1 based on a timing Te at which a second maintenance period H2 exceeds a second determination period J2. Here, the second maintenance period H2 is a period during which the amount G2 of change in the location of the pair of AR glasses 10 maintains a state from a point in time at which the amount G2 of change in the location of the pair of AR glasses 10 becomes less than or equal to the third threshold F3 after the amount G2 of change in the location of the pair of AR glasses 10 exceeds the third threshold F3, the state being a state in which the amount G2 of change in the location of the pair of AR glasses 10 is less than or equal to the third threshold F3. The second determination period J2 is, for example, 1.5 seconds. The second determination period J2 is not limited to 1.5 seconds and may be a period less than 1.5 seconds or may be a period greater than 1.5 seconds.

For example, when the second maintenance period H2 exceeds the second determination period J2, the transmittance controller 263*a* determines, as the first timing T1, the timing Te at which the second maintenance period H2 exceeds the second determination period J2. When the second maintenance period H2 does not exceed the second determination period J2, the transmittance controller 263*a* maintains the transmittance CT of the content A1 that is displayed on the pair of AR glasses 10.

Figure 14:
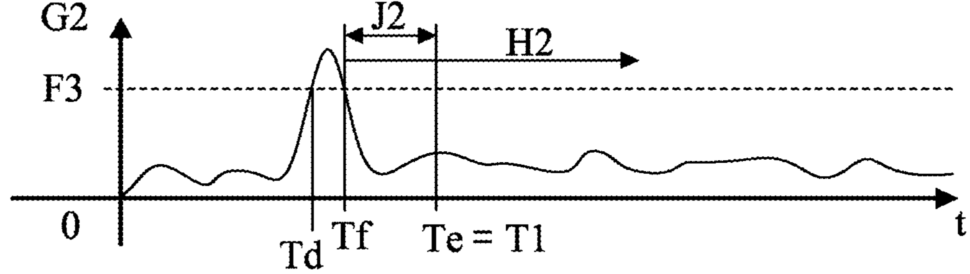
FIG. 14 is a diagram showing yet another example of the determination of the first timing T1.

FIG. 14 is a diagram showing an example of determining, as the first timing T1, the timing Te at which the second maintenance period H2 exceeds the second determination period J2. In FIG. 14, a vertical axis indicates the amount G2 of change in the location of the pair of AR glasses 10. A horizontal axis indicates time t. The second maintenance period H2 starts from a timing Tf. The timing Tf is a timing at which the amount G2 of change in the location of the pair of AR glasses 10 becomes less than or equal to the third threshold F3 after the amount G2 of change in the location of the pair of AR glasses 10 exceeds the third threshold F3. In FIG. 14, the timing Te at which the second maintenance period H2 exceeds the second determination period J2 is equal to the first timing T1.

The transmittance controller 263*a* may determine, as the first timing T1, a timing at which a fourth predetermined time period has elapsed since the timing Te. The fourth predetermined time period is, for example, 0.2 seconds. The fourth predetermined time period is not limited to 0.2 seconds and may be a time period less than 0.2 seconds or may be a time period greater than 0.2 seconds. The method for determining, as the first timing T1, the timing at which the fourth predetermined time period has elapsed since the timing Te is another example of the method for determining the first timing T1 based on a transition of the amount G2 of change in the location of the pair of AR glasses 10.

According to the fourth modification, the transmittance controller 263*a* determines the first timing T1 based on the timing Te at which the second maintenance period H2 exceeds the second determination period J2. Thus, it is possible to adjust the transmittance CT of the content A1 after the location of the pair of AR glasses 10 is settled. As a result, it is possible to substantially prevent the transmittance CT of the content A1 from being adjusted with excessive frequency.

In addition, when the second maintenance period H2 exceeds the second determination period J2, the transmittance controller 263*a* determines, as the first timing T1, the timing Te at which the second maintenance period H2 exceeds the second determination period J2. When the second maintenance period H2 does not exceed the second determination period J2, the transmittance controller 263*a* maintains the transmittance CT of the content A1 that is displayed on the pair of AR glasses 10. Thus, in response to the location of the pair of AR glasses 10 being settled, adjustment of the transmittance CT of the content A1 can be immediately executed, and it is possible to substantially prevent adjustment of the transmittance CT of the content A1 from being executed with excessive frequency.

B5: Fifth Modification

In the first embodiment and in the first modification to the fourth modification, the transmittance controller 263 or 263*a* may determine the first timing T1 based on a timing at which a period, during which the transmittance CT of the content A1 that is displayed on the pair of AR glasses 10 is maintained, exceeds a third determination period.

For example, the transmittance controller 263 or 263*a* determines, as the first timing T1, the timing at which the period, during which the transmittance CT of the content A1 that is displayed on the pair of AR glasses 10 is maintained, exceeds the third determination period. The third determination period is, for example, 1 minute. The third determination period is not limited to 1 minute, and it may be a period less than 1 minute or may be a period greater than 1 minute.

The transmittance controller 263 or 263*a* may determine, as the first timing T1, a timing at which a fifth predetermined time period has elapsed since the timing at which the period, during which the transmittance CT of the content A1 that is displayed on the pair of AR glasses 10 is maintained, exceeds the third determination period. The fifth predetermined time period is, for example, 0.2 seconds. The second predetermined time period is not limited to 0.2 seconds, and it may be a time period less than 0.2 seconds or may be a time period greater than 0.2 seconds.

According to the fifth modification, the transmittance controller 263 or 263*a* determines the first timing T1 based on the timing at which the period, during which the transmittance CT of the content A1 that is displayed on the pair of AR glasses 10 is maintained, exceeds the third determination period. Thus, it is possible to substantially prevent a time period, during which the transmittance CT of the content A1 is not controlled, from exceeding the third determination period. Consequently, for example, it is possible to adjust the transmittance CT of the content A1 at time intervals that are each less than or equal to the third determination period.

B6: Sixth Modification

In the first embodiment and in the first modification to the fifth modification, in the control information D shown in FIG. 4, the degree of lightness Li of the content A1 is divided into three ranges. However, in the control information D, the degree of lightness Li of the content A1 may be divided into two ranges or may be divided into four or more ranges. In a sixth modification, values indicated by the control information D are determined based on results of a verification experiment conducted in advance, as in the first embodiment. However, in the sixth modification, the values indicated by the control information D are not limited to values determined based on results of a verification experiment conducted in advance. For example, in the sixth modification, the values indicated by the control information D may be values customized for the user U. In addition, in the sixth modification, the values indicated by the control information D may be determined by a designer rather than being based on the results of a verification experiment conducted in advance.

B7: Seventh Modification

In the first embodiment and the first modification to the sixth modification, in the control information D shown in FIG. 4, the lightness EB of the environment is divided into six ranges. However, in the control information D, the lightness EB of the environment may be divided into two or more and less than six ranges, or it may be divided into seven or more ranges. In a seventh modification, values indicated by the control information D are determined based on results of a verification experiment conducted in advance, as in the first embodiment. However, in the seventh modification, the values indicated by the control information D are not limited to values determined based on results of a verification experiment conducted in advance. For example, in the seventh modification, the values indicated by the control information D may be values customized for the user U. In addition, in the seventh modification, the values indicated by the control information D may be determined by a designer rather than being based on the results of a verification experiment conducted in advance.

B8: Eighth Modification

In the first embodiment and in the first modification to the seventh modification, in the control information D shown in FIG. 4, the degree of luminance Lu of the content A1 is used as information for determining the transmittance CT of the content A1. However, as information for determining the transmittance CT of the content A1, a target degree of lightness of the content A1 may be used instead of the degree of luminance Lu of the content A1. The target degree of lightness of the content A1 indicates, by percentage, a ratio of a degree of lightness of the content A1 that is to be displayed on the pair of AR glasses 10 to the degree of lightness Li of the content A1 indicated by the content information B1. For example, when the degree of lightness of the content A1 that is to be displayed on the pair of AR glasses 10 is equal to the degree of lightness Li of the content A1 indicated by the content information B1, the target degree of lightness of the content A1 is equal to 100%. When the target degree of lightness of the content A1 is used as the information for determining the transmittance CT of the content A1, the transmittance CT of the content A1 is obtained by subtracting the target degree of lightness of the content A1 from 100%. Hereinafter, an "association between a value of the degree of lightness Li of the content A1, a value of the lightness EB of the environment, a value of the target degree of lightness of the content A1, and a value of the transmittance CT of the content A1" may be simply referred to as a "second association." In an eighth modification, values indicated by the control information D are determined based on results of a verification experiment conducted in advance, for example. In the verification experiment in the eighth modification, in a state in which a value of the degree of lightness Li of the content A1, a value of the lightness EB of the environment, a value of the target degree of lightness of the content A1, and a value of the transmittance CT of the content A1 are each changed, a plurality of subjects each wearing the pair of AR glasses 10 determine second associations that cause both the content A1 and the real world to be visually recognized with ease. In the eighth modification, the second associations determined by the verification experiment are reflected in the values indicated by the control information D. However, in the eighth modification, the values indicated by the control information D are not limited to values determined based on results of a verification experiment conducted in advance. For example, in the eighth modification, the values indicated by the control information D may be values customized for the user U. In addition, in the eighth modification, the values indicated by the control information D may be determined by a designer rather than being based on the results of a verification experiment conducted in advance.

B9: Ninth Modification

In the first embodiment and in the first modification to the eighth modification, the control information D shown in FIG. 4 may be stored by the pair of AR glasses 10 or by the server 30. When the pair of AR glasses 10 or the server 30 stores the control information D, the transmittance controller 263 or 263*a* acquires the degree of luminance Lu of the content A1, which is in association with both the maximum lightness EBmax and the degree of lightness Li of the content A1, from the pair of AR glasses 10 or from the server 30.

B10: Tenth Modification

Each element implemented by the processor 26 of the terminal apparatus 20 or 20A may be implemented by the processor 19 of the pair of AR glasses 10. In this case, the processor 19 of the pair of AR glasses 10 is an example of the transmittance control apparatus and the display 16 of the pair of AR glasses 10 is an example of the see-through display. Alternatively, each element implemented by the processor 26 of the terminal apparatus 20 or 20A may be implemented by the server 30. In this case, the server 30 is an example of the transmittance control apparatus.

According to the tenth modification, the terminal apparatus 20 and 20A can be omitted.

C: Other Matters (1) Each function shown in FIG. 2, FIG. 3, or FIG. 12 may be implemented by any combination of hardware and software. The method for implementing each function is not particularly limited. Each function may be implemented by one device that is physically or logically aggregated. Alternatively, each function may be realized by a system in which two or more physically or logically separate devices are directly or indirectly connected to one another (by use of cables and radio, or by cables alone, or by radio alone, for example). Each function may be implemented by combining software with the one device described above or with the two or more devices.

(2) The term "apparatus" in this specification may be understood as another term such as circuit, device, unit, etc.

(3) In each of the first embodiment and the first modification to the tenth modification, the storage device 18 and the storage device 25 may be constituted of at least one of an optical disk such as a Compact Disc-ROM (CD-ROM), a hard disk drive, a flexible disk, a magneto-optical disk (e.g., a compact disk, a digital multi-purpose disk, a Blu-ray (registered trademark) disc), a smart-card, a flash memory (e.g., a card, a stick, a key drive), a floppy (registered trademark) disk, a magnetic strip, etc. In addition, the program may be transmitted from a network via telecommunication lines.

(4) Each of the first embodiment and the first modification to the tenth modification may be applied to at least one of systems using Long Term Evolution (LTE), LTE-advanced (LTE-A), SUPER 3G, IMT-Advanced, 4th generation mobile communication system (4G), 5th generation mobile communication system (5G), 6th generation mobile communication system (6G), xth generation mobile communication system (xG) (where x is an integer or a decimal, for example), future radio access (FRA), new Radio (NR), New radio access (NX), Future generation radio access (FX), W-CDMA (registered trademark), GSM (registered trademark), CDMA2000, Ultra Mobile Broadband (UMB), IEEE 802.11 [Wi-Fi (registered trademark)], IEEE 802.16 [WiMAX (registered trademark)], IEEE 802.20, Ultra-wideband (UWB), Bluetooth (registered trademark), and other appropriate systems, and next-generation systems extended, modified, generated, or defined based on these systems. In addition, each of the first embodiment and the first modification to the seventh modification may be applied to a combination of systems (e.g., a combination of at least one of LTE and LTE-A with 5G, etc.).

(5) The order of processes, sequences, flowcharts, etc., that have been used to describe the first embodiment and the first modification to the tenth modification may be changed as long as they do not conflict. For example, although a variety of methods has been illustrated in this disclosure with a variety of elements of steps in exemplary orders, the specific orders presented herein are by no means limiting.

(6) In each of the first embodiment and the first modification to the tenth modification, the input and output of information, or the input or output of information, etc., may be stored in a specific location (e.g., a memory) or may be managed by use of a management table. The information, etc., that is, the input and output, or the input or the output, may be overwritten, updated, or appended. The information, etc., that is output may be deleted. The information, etc., that is input may be transmitted to other devices.

(7) In each of the first embodiment and the first modification to the tenth modification, determination may be made based on values that can be represented by one bit (0 or 1), may be made based on Boolean values (true or false), or may be made based on comparing numerical values (for example, comparison with a predetermined value).

(8) The programs shown in each of the first embodiment and the first modification to the tenth modification should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or by another name. In addition, software, instructions, etc., may be transmitted and received via communication media. For example, when the software is transmitted from a website, a server, or other remote sources using at least one of wired technology (a coaxial cable, a fiber optic cable, a twisted pair cable, a digital subscriber line (DSL), etc.) or wireless technology (infrared, microwave, etc.), at least one of these wired and wireless technologies is included within the definition of the transmission medium.

(9) The information, etc., described in each of the first embodiment and the first modification to the tenth modification may be explained by use of various techniques. For example, data, instructions, etc., may be presented by freely selected combination of voltages, currents, electromagnetic waves, magnetic fields or magnetic particles, light fields or photons. It should be noted that the terms described in this specification and the terms necessary for understanding this specification may be replaced by terms having the same or similar meanings.

(10) In each of the first embodiment and the first modification to the tenth modification, the terms "system" and "network" are used interchangeably.

(11) In each of the first embodiment and the first modification to the tenth modification, at least one of the pair of AR glasses 10, the terminal apparatus 20, and the terminal apparatus 20A may be a mobile station. A mobile station may be referred to, by one skilled in the art, as a "subscriber station," a "mobile object," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client," or some other suitable term.

(12) A mobile station may be referred to as a transmitting device, a receiving device, or a communication device, etc. The move station mobile station may a device provided on a movable object or the movable object itself. The movable object means an object that is able to be moved. Movement speed of the movable object is not limited. The movable object can be stopped. For example, the movable object is, but is not limited to, a vehicle, a transportation vehicle, an automobile, a motorcycle, a bicycle, a connected car, a shovel car, a bulldozer, a wheel loader, a dump truck, a forklift, a train, a bus, a cart, a handcart, a ship, a watercraft, an airplane, a rocket, a satellite, a drone (registered trademarks), a multirotor, a quadcopter, a balloon, and an object provided in any of these. The movable object may be a movable object that autonomously travels based on operation commands. The movable object may be a vehicle (e.g., a car, an airplane, etc.), or may be an unmanned movable object (e.g., a drone, an automated driving vehicle, etc.), or may be a robot (a manned robot or an unmanned robot). The movable object may be a device that does not necessarily move during communication. For example, the movable object may be an Internet of Things (IoT) device, such as a sensor.

(13) In each of the first embodiment and the first modification to the tenth modification, the term "determining" may mean a wide variety of operations. For example, the term "determining" may be used when practically "determining" that some act of judging, calculating, computing, processing, deriving, investigating, looking up, searching, inquiring (for example, looking up, searching, or inquiring a table, a database, or some other data structure), ascertaining, etc., has taken place. Furthermore, "determining" may be used when practically "determining" that some act of receiving (for example, receiving information), transmitting (for example, transmitting information), inputting, outputting, accessing (for example, accessing data in a memory) etc., has taken place. Furthermore, "determining" may be used when practically "determining" that some act of resolving, selecting, choosing, establishing, comparing, etc., has taken place. That is, "determining" may be used when practically determining to take some action. In addition, the term "determining" may be replaced with "assuming," "expecting," "considering," etc.

(14) In each of the first embodiment and the first modification to the tenth modification, the term "connected," or any modification thereof, may mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be replaced with "access." As used in this specification, two elements may be considered "connected" or "coupled" to each other by using one or more electrical wires, cables, and printed electrical connections, or by using one or more electrical wires, cables, or printed electrical connections. In addition, two elements may be considered "connected" or "coupled" to each other by using electromagnetic energy, etc., which is a non-limiting and non-inclusive example, having wavelengths in radio frequency regions, microwave regions, and optical (both visible and invisible) regions.

(15) In each of the first embodiment and the first modification to the tenth modification, the phrase "based on" as used in this specification does not mean "based only on," unless specified otherwise. In other words, the "based on" means both "based only on" and "based at least on."

(16) Any reference to an element using the designations "first," and "second," etc., used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(17) When terms such as "include" and modifications thereof are used in each of the first embodiment and the first modification to the tenth modification, these terms are intended to be inclusive, in a manner similar to the way the term "comprise" is used. Furthermore, the term "or" as used herein or in the claims is intended to be non-exclusive-OR.

(18) In the present disclosure, for example, when articles such as "a," "an," and "the" in English are added in translation, these articles include plurals unless otherwise clearly indicated by the context.

(19) It will be obvious to those skilled in the art that the present invention is not limited to the embodiments described in the specification. The present invention can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way. In addition, a plurality of modes selected from the modes illustrated the specification may be used in combination.

D: Aspects Derivable From the Embodiment and the Modifications Described Above The following configurations are derivable from at least one of the embodiment and the modifications described above.

D1: First Aspect

A transmittance control apparatus according to a first aspect includes a first identifier, a second identifier, and a transmittance controller. The first identifier is configured to identify, based on display information indicative of a target for display, a degree of lightness of the target for display. The second identifier is configured to identify lightness of an environment in which a see-through display is disposed. The transmittance controller is configured to, in a state in which the degree of lightness of the target for display does not vary and the lightness of the environment fluctuates in a range less than or equal to a first lightness, reduce transmittance of the target for display that is displayed on the see-through display in accordance with an increase in the lightness of the environment. The transmittance controller is configured to control the transmittance of the target for display that is displayed on the see-through display at a first timing based on: a maximum lightness of the environment in a first period previous to the first timing and the degree of lightness of the target for display.

According to this aspect, it is possible to maintain visibility of the target for display and to substantially prevent an unnecessary change in transmittance of the target for display caused by a change in lightness of the environment. Therefore, it is possible to substantially prevent a state in which it is difficult for a user of a see-through display to visually recognize a target for display that is displayed on the see-through display.

D2: Second Aspect

In an example (second aspect) of the first aspect, the transmittance controller is configured to determine the first timing based on an amount of change in the lightness of the environment. According to this aspect, it is possible to determine the first timing based either on a magnitude of the amount of change in the lightness of the environment or on a transition of the amount of change in the lightness of the environment, for example.

D3: Third Aspect

In an example (third aspect) of the second aspect, the transmittance controller is configured to determine the first timing based on a timing at which an amount of change in the lightness of the environment exceeds a first threshold. According to this aspect, it is possible to reduce frequency of adjusting the transmittance of the target for display compared to a configuration in which the transmittance of the target for display is constantly adjusted regardless of a magnitude of the amount of change in the lightness of the environment. Thus, it is possible to substantially prevent the transmittance of the target for display from being adjusted with excessive frequency.

D4: Fourth Aspect

In an example (fourth aspect) of the third aspect, the transmittance controller is configured to: when an amount of change in the lightness of the environment exceeds a first threshold, determine, as the first timing, a timing at which the amount of change in the lightness of the environment exceeds the first threshold; and when the amount of change in the lightness of the environment does not exceed the first threshold, maintain the transmittance of the target for display that is displayed on the see-through display. According to this aspect, it is possible to execute adjustment of the transmittance of the target for display at a necessary timing and to substantially prevent adjustment of the transmittance of the target for display from being executed with excessive frequency.

D5: Fifth Aspect

In an example (fifth aspect) of the second aspect, the transmittance controller is configured to determine the first timing based on a timing at which a first maintenance period exceeds a first determination period. The first maintenance period is a period during which an amount of change in the lightness of the environment maintains a state from a point in time at which the amount of change in the lightness of the environment becomes less than or equal to a second threshold after the amount of change in the lightness of the environment exceeds the second threshold, the state being a state in which the amount of change in the lightness of the environment is less than or equal to the second threshold. According to this aspect, it is possible to adjust the transmittance of the target for display after the lightness of the environment is settled. Thus, it is possible to substantially prevent the transmittance of the target for display from being adjusted with excessive frequency.

D6: Sixth Aspect

In an example (sixth aspect) of the fifth aspect, the transmittance controller is configured to: when the first maintenance period exceeds the first determination period, determine, as the first timing, a timing at which the first maintenance period exceeds the first determination period; and when the first maintenance period does not exceed the first determination period, maintain the transmittance of the target for display that is displayed on the see-through display. According to this aspect, in response to the lightness of the environment being settled, adjustment of the transmittance of the target for display can be immediately executed, and it is possible to substantially prevent adjustment of the transmittance of the target for display from being executed with excessive frequency.

D7: Seventh Aspect

In an example (seventh aspect) of the first aspect, the transmittance control apparatus is further comprising a third identifier configured to identify a location of the see-through display, wherein the transmittance controller is configured to determine the first timing based on an amount of change in the location of the see-through display. According to this aspect, when there is a possibility that the lightness of the environment in which the see-through display is disposed changes, it is possible to determine the first timing.

D8: Eighth Aspect

In an example (eighth aspect) of the seventh aspect, the transmittance controller is configured to determine the first timing based on a timing at which a second maintenance period exceeds a second determination period. The second maintenance period is a period during which an amount of change in the location of the see-through display maintains a state from a point in time at which the amount of change in the location of the see-through display becomes less than or equal to a third threshold after the amount of change in the location of the see-through display exceeds the third threshold, the state being a state in which the amount of change in the location of the see-through display is less than or equal to the third threshold. According to this aspect, it is possible to adjust the transmittance of the target for display after the location of the see-through display is settled. Thus, it is possible to substantially prevent the transmittance of the target for display from being adjusted with excessive frequency.

D9: Ninth Aspect

In an example (ninth aspect) of the eighth aspect, the transmittance controller is configured to: when the second maintenance period exceeds the second determination period, determine, as the first timing, a timing at which the second maintenance period exceeds the second determination period; and when the second maintenance period does not exceed the second determination period, maintain the transmittance of the target for display that is displayed on the see-through display. According to this aspect, in response to the location of the see-through display being settled, adjustment of the transmittance of the target for display can be immediately executed, and it is possible to substantially prevent adjustment of the transmittance of the target for display from being executed with excessive frequency.

D10: Tenth Aspect

In an example (tenth aspect) of any one of the first to the ninth aspects, the transmittance controller is configured to determine the first timing based on a timing at which a period during which the transmittance of the target for display that is displayed on the see-through display is maintained exceeds a third determination period. According to this aspect, it is possible to substantially prevent a time period, during which the transmittance of the target for display is not controlled, from exceeding the third determination period. Thus, for example, it is possible to adjust the transmittance of the target for display at time intervals that are each less than or equal to the third determination period.

DESCRIPTION OF REFERENCE SIGNS

1 . . . display control system, 10 . . . pair of AR glasses, 11 . . . see-through display unit, 15 . . . ambient light sensor, 16 . . . display, 17 . . . communication device, 18 . . . storage device, 19 . . . processor, 20 . . . terminal apparatus, 20A . . . terminal apparatus, 21 . . . input device, 22 . . . display, 23 . . . communication device, 24 . . . communication device, 25 . . . storage device, 26 . . . processor, 27 . . . bus, 30 . . . server, 101 . . . bus, 191 . . . operation controller, 261 . . . first identifier, 262 . . . second identifier, 263 . . . transmittance controller, **263*a* . . . transmittance controller, 264** . . . third identifier, NW . . . communication network.

The invention claimed is:

1. A transmittance control apparatus comprising:

processing circuitry configured to:

identify, based on display information indicative of a target for display, a degree of lightness of the target for display;

identify a lightness level of an environment in which a see-through display is disposed; and at a first timing at which a transmittance of the target for display is controlled, control the transmittance of the target for display on the see-through display based on a maximum lightness level of the environment during a first period prior to the first timing and on the degree of lightness of the target for display, by using an association among the degree of lightness of the target for display, the lightness level of the environment, and the transmittance of the target for display, wherein the maximum lightness level of the environment during the first period is indicated by an environment-lightness information set among a plurality of environment-lightness information sets, wherein the association includes a first association and a second association, wherein the first association defines a relationship such that when the degree of lightness of the target for display does not fluctuate and the lightness level of the environment fluctuates within a range not exceeding a first lightness level, the transmittance of the target for display on the see-through display is reduced in accordance with an increase in the lightness level of the environment, and wherein the second association defines a relationship such that when the degree of lightness of the target for display does not fluctuate and the lightness level of the environment fluctuates within a range exceeding the first lightness level, the transmittance of the target for display on the see-through display is increased in accordance with an increase in the lightness level of the environment or is maintained regardless of an increase in the lightness level of the environment.

2. The transmittance control apparatus according to claim 1, wherein the processing circuitry is configured to determine the first timing based on an amount of change in the lightness of the environment.

3. The transmittance control apparatus according to claim 1, wherein the processing circuitry is configured to determine the first timing based on a timing at which an amount of change in the lightness of the environment exceeds a threshold.

4. The transmittance control apparatus according to claim 1, wherein the processing circuitry is configured to:

when an amount of change in the lightness of the environment exceeds a threshold, determine, as the first timing, a timing at which the amount of change in the lightness of the environment exceeds the threshold; and when the amount of change in the lightness of the environment does not exceed the threshold, maintain the transmittance of the target for display that is displayed on the see-through display.

5. The transmittance control apparatus according to claim 1, wherein the processing circuitry is configured to determine the first timing based on a timing at which a maintenance period exceeds a determination period; and wherein the maintenance period is a period during which an amount of change in the lightness of the environment maintains a state from a point in time at which the amount of change in the lightness of the environment becomes less than or equal to a threshold after the amount of change in the lightness of the environment exceeds the threshold, the state being a state in which the amount of change in the lightness of the environment is less than or equal to the threshold.

6. The transmittance control apparatus according to claim 1, wherein the processing circuitry is configured to:

when a maintenance period exceeds a determination period, determine, as the first timing, a timing at which the maintenance period exceeds the determination period; and when the maintenance period does not exceed the determination period, maintain the transmittance of the target for display that is displayed on the see-through display; and wherein the maintenance period is a period during which an amount of change in the lightness of the environment maintains a state from a point in time at which the amount of change in the lightness of the environment becomes less than or equal to a threshold after the amount of change in the lightness of the environment exceeds the threshold, the state being a state in which the amount of change in the lightness of the environment is less than or equal to the threshold.

7. The transmittance control apparatus according to claim 1, wherein the processing circuitry is configured to identify a location of the see-through display, wherein the processing circuitry is configured to determine the first timing based on an amount of change in the location of the see-through display.

8. The transmittance control apparatus according to claim 1, wherein the processing circuitry is configured to identify a location of the see-through display, wherein the processing circuitry is configured to determine the first timing based on a timing at which a maintenance period exceeds a determination period; and wherein the maintenance period is a period during which an amount of change in the location of the see-through display maintains a state from a point in time at which the amount of change in the location of the see-through display becomes less than or equal to a threshold after the amount of change in the location of the see-through display exceeds the threshold, the state being a state in which the amount of change in the location of the see-through display is less than or equal to the threshold.

9. The transmittance control apparatus according to claim 1, wherein the processing circuitry is configured to identify a location of the see-through display, wherein the processing circuitry is configured to:

when a maintenance period exceeds a determination period, determine, as the first timing, a timing at which the maintenance period exceeds the determination period; and when the maintenance period does not exceed the determination period, maintain the transmittance of the target for display that is displayed on the see-through display; and wherein the maintenance period is a period during which an amount of change in the location of the see-through display maintains a state from a point in time at which the amount of change in the location of the see-through display becomes less than or equal to a threshold after the amount of change in the location of the see-through display exceeds the threshold, the state being a state in which the amount of change in the location of the see-through display is less than or equal to the threshold.

10. The transmittance control apparatus according to claim 1, wherein the processing circuitry is configured to determine the first timing based on a timing at which a period during which the transmittance of the target for display that is displayed on the see-through display is maintained exceeds a determination period.

* * * * *